(12) United States Patent
Schmierer

(10) Patent No.: US 10,845,458 B2
(45) Date of Patent: Nov. 24, 2020

(54) WIDE AREA DIRECTION FINDING USING A PLURALITY OF RF RECEIVERS

(71) Applicant: Jay Schmierer, Redmond, WA (US)

(72) Inventor: Jay Schmierer, Redmond, WA (US)

( * ) Notice: Subject to any disclaimer, the term of this patent is extended or adjusted under 35 U.S.C. 154(b) by 0 days.

(21) Appl. No.: 16/029,563

(22) Filed: Jul. 7, 2018

(65) Prior Publication Data

US 2020/0011962 A1 Jan. 9, 2020

(51) Int. Cl.
| | |
|---|---|
| *G01S 5/06* | (2006.01) |
| *H04W 4/02* | (2018.01) |
| *H04W 64/00* | (2009.01) |
| *G01S 5/02* | (2010.01) |
| *G01S 11/08* | (2006.01) |

(52) U.S. Cl.
CPC .............. *G01S 5/06* (2013.01); *G01S 5/0215* (2013.01); *G01S 11/08* (2013.01)

(58) Field of Classification Search
CPC ........... H04B 17/23; H04B 17/27; G01S 5/02; G01S 3/043; G01S 3/48; G01S 5/04; G01S 3/18; G01S 5/06; H04W 64/00; H04W 63/003; H04W 4/02; H04W 4/029
USPC .... 455/456.1–456.6, 457, 67.11, 404.2, 566; 342/417, 442, 443, 451, 146
See application file for complete search history.

(56) References Cited

U.S. PATENT DOCUMENTS

| | | | | |
|---|---|---|---|---|
| 4,443,801 A | * | 4/1984 | Klose | ................. G01S 3/74 342/378 |
| 5,003,317 A | * | 3/1991 | Gray | ................. G01S 5/0009 342/457 |
| 8,994,591 B2 | * | 3/2015 | Dupray | ................. G01C 21/206 342/457 |
| 2004/0164902 A1 | * | 8/2004 | Karlsson | ................. G01S 3/046 342/449 |
| 2007/0296631 A1 | * | 12/2007 | Ray | ................. G01S 5/0009 342/387 |
| 2013/0260785 A1 | * | 10/2013 | Shakespeare | ......... H04W 64/00 455/456.1 |
| 2017/0374572 A1 | * | 12/2017 | Kleinbeck | ............ H04W 24/10 |
| 2019/0137277 A1 | * | 5/2019 | Clymer | ................. G01C 21/20 |

* cited by examiner

*Primary Examiner* — Philip Sobutka
(74) *Attorney, Agent, or Firm* — Seattle Patent Group LLC; James Haugen

(57) ABSTRACT

Disclosed, among other things is a wide area direction finding system comprising multiple radio frequency (RF) receiving units and a display computer. The RF receiving units may be in different geographic areas to make use of triangulation to precisely locate a target, allowing for increased area coverage and accuracy when locating a target. Locating a target may draw from real-time information using a "live mode," or from a past event using a "history mode" on the display computer.

12 Claims, 7 Drawing Sheets

WIDE AREA DIRECTION FINDING USING A PLURALITY OF RF RECEIVERS

FIELD

This disclosure generally relates to wide area direction finding.

BACKGROUND

Direction finding is a method of determining the direction from which a received signal emanated. This method has been commonly used in locating targets, such as radio-tagged wildlife and missing aircraft, that emit a radio frequency. These systems tend to use a single receiver that receives the emitted signal and calculates the target's location. The signal typically must remain active for most direction finding equipment to locate the target. For the few direction finding systems that can locate short duration signals, the results can be inaccurate and imprecise. These systems can require high-speed data connections to operate, which limits the system's usability.

SUMMARY

The instant application presents a simplified summary of the disclosure to provide a brief overview to the reader in which to present key concepts. A more detailed description of the disclosure can be found in subsequent sections of this application.

The instant application discloses, among other things, a wide area direction finding system. This system may comprise multiple radio frequency (RF) receiving units and a display computer. These RF receiving units may be in different geographic areas to make use of triangulation. The use of multiple RF units for triangulation, among other methods, may allow the system to more precisely locate a target than current single RF unit methods.

This wide area direction finding system may be designed to operate with minimal bandwidth connectivity between the RF units and the display computer. The flexibility of this system to establish a connection to another unit with minimal bandwidth may ensure its usability with a large variety of network conditions. The system may allow for flexibility in connectivity choices and, therefore, physical location of the user. For example, the RF units may be able to connect to a display computer through physical wires, cellular services, or satellites, among other things. Since the system may not require high-speed connections, it may operate in more environments than existing equipment.

The system may be designed to measure the phase or frequency, among other things, of the received signal in multiple ways. For example, through the pseudo Doppler method or phase correlation, among other methods. The phase information from each of the RF units may be processed in a central processing unit (CPU), or display computer, to determine the direction from which the signal is emanating. Each RF unit's distance from the signal may be computed through time distance of arrival techniques, among other things. This method may require all RF receiving units to have GPS technology, which can be used to time-sync the RF units and received signals, among other things.

This wide area direction finding system may be designed to offer the user flexibility. The system may be designed to be modular, among other things. The modular nature of the system may allow the user to customize their system to meet their needs. The system may be designed to accommodate different frequencies, system expansions, and changing configurations of RF units, among other things. An RF mask in the display computer may be used to decrease potential interference from channels surrounding the target frequency. The RF mask may be user-customizable to allow the system to accurately operate at multiple frequencies, while still removing noise from the signal.

The system may also be designed to work for short duration targets, among other things. These short duration targets may be saved in the display computer's history and may be recalled after the transmission is completed. This feature of the system may be used to locate a missing plane after the black box stops transmitting, among other things.

In addition, this system may be designed to locate both stationary and moving targets. The ability to track moving targets may be used to locate radio-tagged wildlife, among other things. The option to use multiple RF units may allow for increased area coverage and accuracy when tracking moving targets. The customization of this system may allow it to be amended and used in numerous applications, such as avalanche rescue and reconnaissance, among other things.

Further features of this disclosure are detailed in subsequent sections and the attached drawings of this instant application.

BRIEF DESCRIPTION OF THE DRAWINGS

The present description may be better understood from the following detailed description read in light of the appended drawings, wherein.

DETAILED DESCRIPTION

Figure 1:
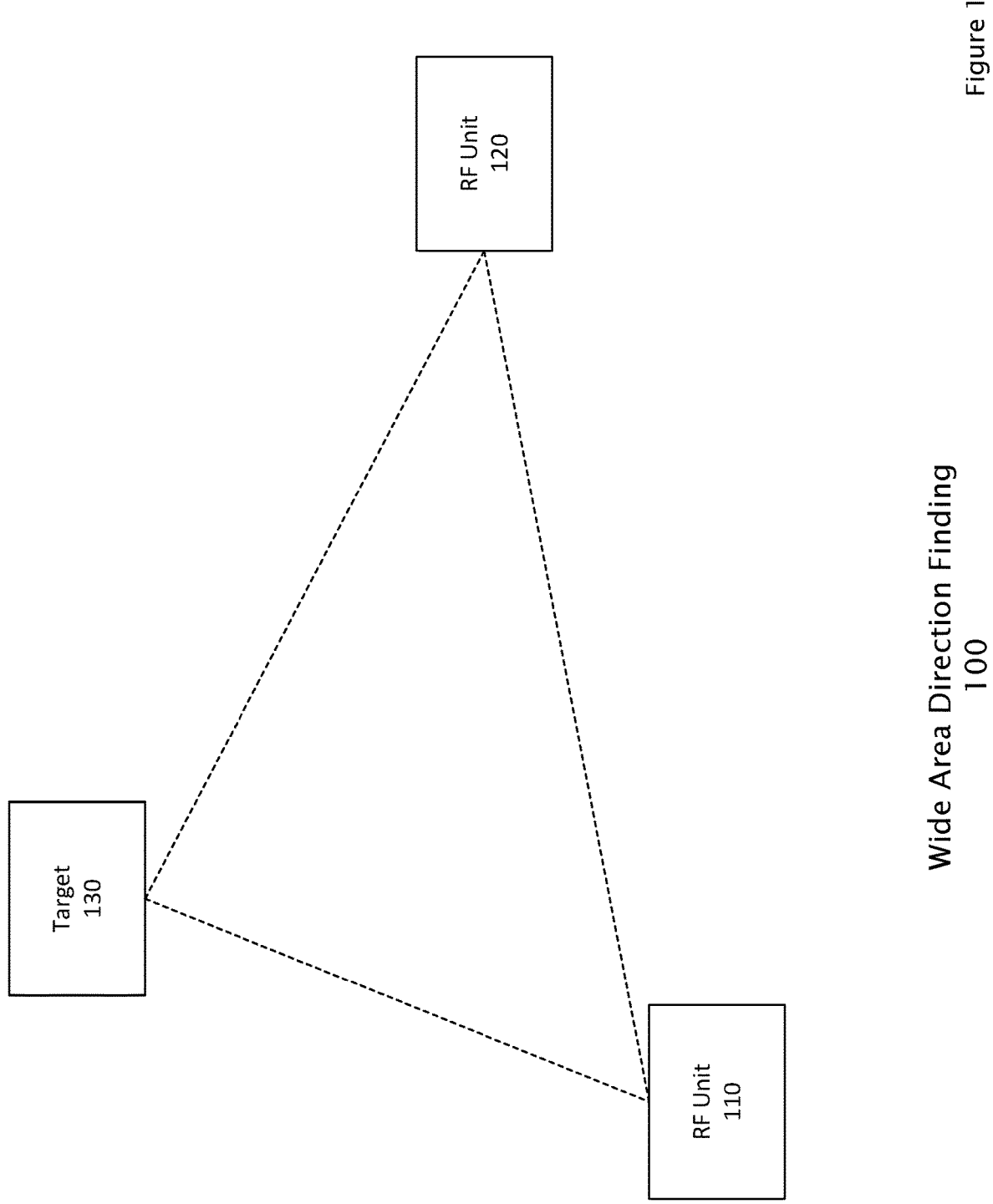
FIG. 1 is a block diagram illustrating a Wide Area Direction Finding system configured to make use of triangulation, according to one implementation.

A more particular description of certain implementations of Wide Area Direction Finding may be had by references to the implementations shown in the drawings that form a part of this specification, in which like numerals represent like objects.

The illustrated operations in the description show certain events occurring in a certain order. One skilled in the art will recognize that certain operations may be performed in a different order, modified or removed. Moreover, steps may be added to the described logic and still conform to the described implementations.

FIG. 1 is a block diagram illustrating a Wide Area Direction Finding system configured to make use of triangulation, according to one implementation. Wide Area Direction Finding 100 may comprise multiple radio frequency (RF) receiving units, for example, RF Unit 110 and RF Unit 120, which connect to a display computer. RF Unit 110 and RF Unit 120 may be phase correlated. The RF receiving units may be in different geographic areas to make use of triangulation. The use of multiple RF units for triangulation, among other methods, may allow the system to more precisely locate a Target 130 than conventional single RF unit methods. Locating a Target 130 may draw from real-time information, using a "live mode" setting, or from a past event, using a "history mode" setting. The history mode setting may provide a last location from which a signal emanated. Implementation of the history mode setting may improve accuracy for locating short duration targets, which are often the most difficult to find and which conventional systems often miss.

Figure 2:
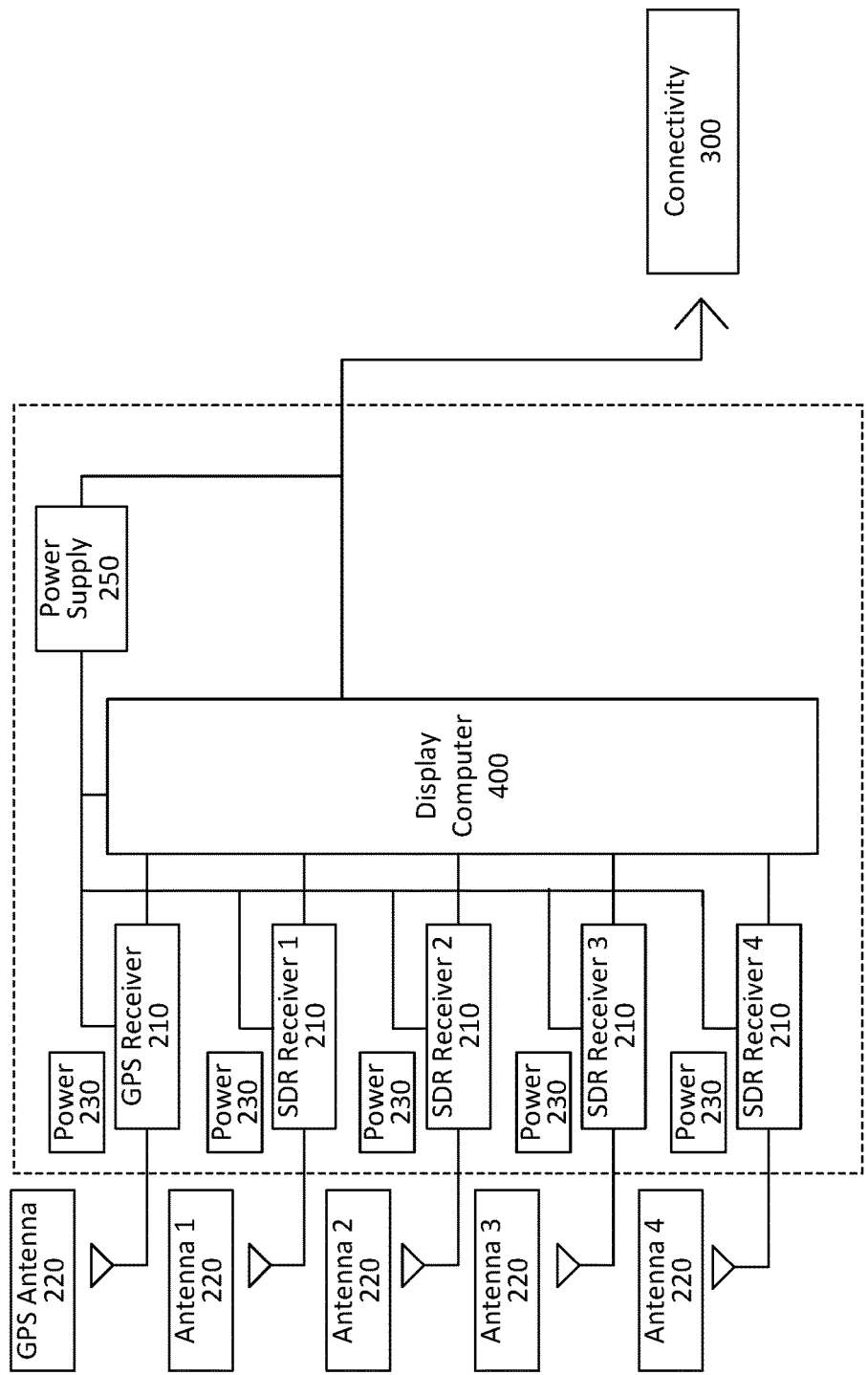
FIG. 2 is a block diagram illustrating a radio frequency (RF) receiving unit in a Wide Area Direction Finding system, according to one implementation.

FIG. 2 is a block diagram illustrating a radio frequency (RF) receiving unit in a Wide Area Direction Finding system. The Wide Area Direction Finding system may be designed to measure the frequency or phase of the received signal in multiple ways. For example, it may use the pseudo Doppler method or phase correlation, among other methods. For example, the Wide Area Direction Finding system may measure and compare frequencies between a pseudo-Doppler antenna and a received signal to determine the direction of the received signal's point of origin. In one implementation, the phase information from each of the RF Units 110 may be processed in a Display Computer 400 to determine the direction from which the signal is emanating. Each RF unit's distance from the signal may be computed through time distance of arrival techniques, among other things. This method may require all RF receiving units to have GPS technology. For example, RF Unit 110 may use GPS Receiver 210, to time-sync the RF units and received signals, among other things. Display Computer 400 may also use multiple synchronized software defined radio (SDR) receivers, for example, SDR Receiver 1, SDR Receiver 2, SDR Receiver 3, and SDR Receiver 4 210, to determine a target heading and signal strength. In Display Computer 400, an RF mask may be set for message trigger points. GPS Receiver 210 may work with GPS Antenna 220, and SDR Receivers 1-4 210 may work with Antennas 1-4 220. The receivers may receive electrical Power 230 from Power Supply 250. Power 230 and Connectivity 300 may be combined to provide a simplified interface for the RF unit. The receivers may communicate with Display Computer 400 through a variety of Connectivity 300 options.

Figure 3:
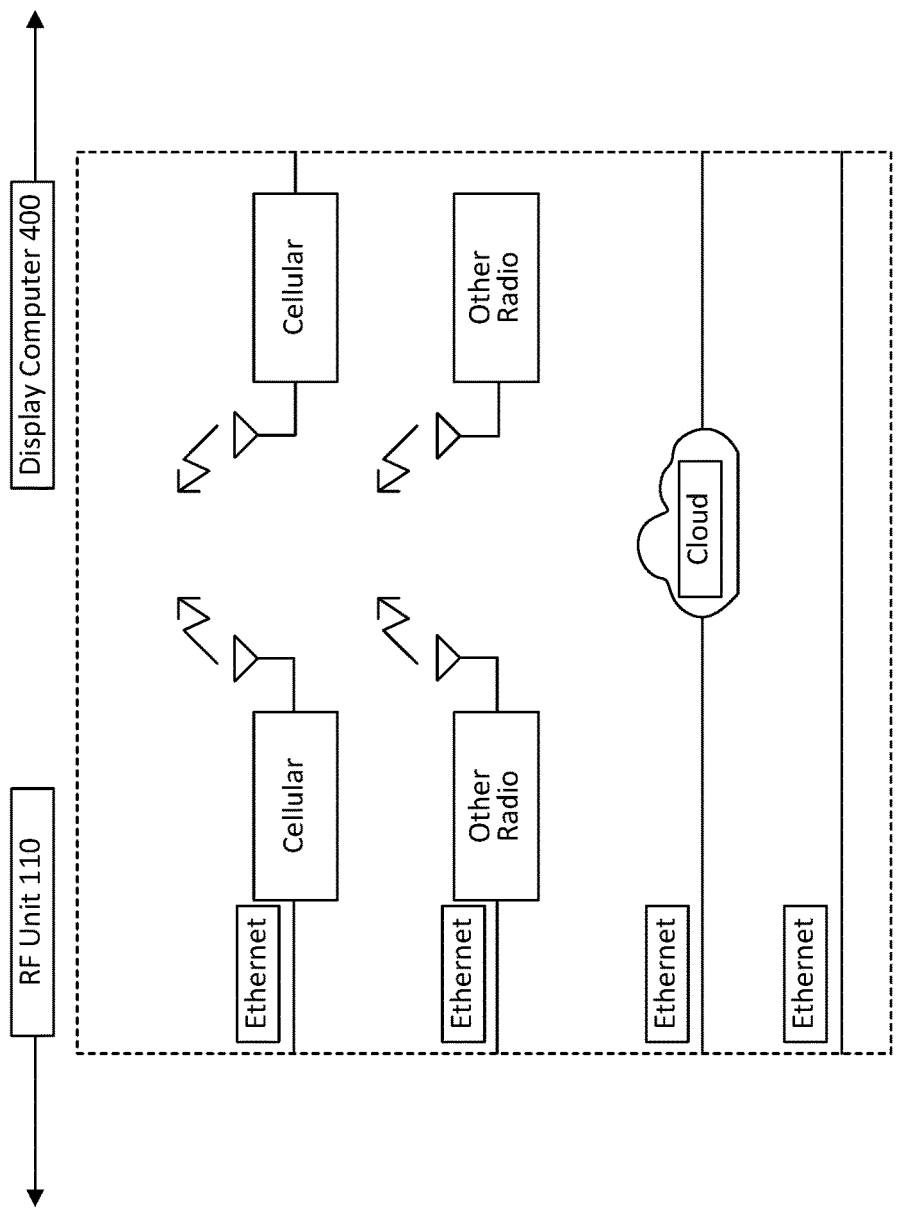
FIG. 3 is a block diagram illustrating connectivity options for a Wide Area Direction Finding system, according to one implementation.

FIG. 3 is a block diagram illustrating connectivity options for a Wide Area Direction Finding System. The Wide Area Direction Finding system may be designed to operate with minimal bandwidth connectivity between the RF units and the display computer. The flexibility of this system to establish a connection to another unit with minimal bandwidth may ensure its usability with a large variety of network conditions. The system may allow for flexibility in connectivity choices and, therefore, physical location of the user. For example, the RF units may be able to connect to a display computer through physical wires, such as Ethernet cables, cellular services, cloud services, two-way radio, or satellites, among other things. Since the user may not require high-speed connections, this system may operate in more environments than existing equipment.

Figure 4:
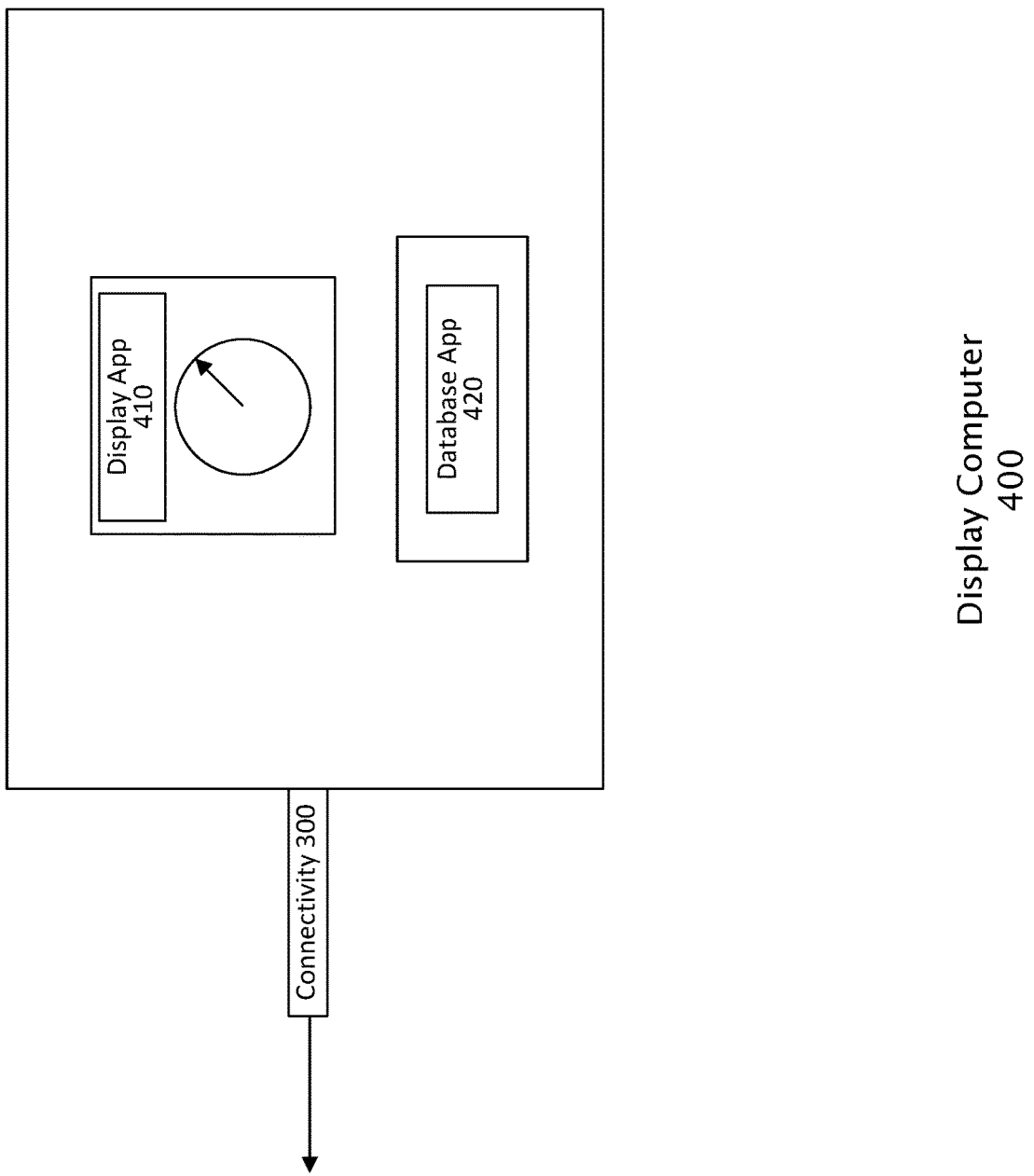
FIG. 4 is a block diagram illustrating a display computer for a Wide Area Direction Finding system, according to one implementation.

FIG. 4 is a block diagram illustrating a display computer for a Wide Area Direction Finding system. In one implementation, Display Computer 400 may be operable to host Display App 410 and Database App 420, using a desired Connectivity 300 option. Display App 410 may be located on Display Computer 400 and may include a terrain and road map with an underlay having options for a compass-based or relative-based orientation. Information from one or more RF units may be displayed as an overlay. Information from one or more RF units may be viewed in a "live mode" from the RF units, or may be stored and viewable in a "history mode" on Database App 420. For each piece of information, the RF unit location may display with a line projecting from it, indicating the target heading. Display App 410 may also display a target signal strength. Display App 410 may also allow a user to adjust operating parameters of the RF unit, including multiple frequency operation.

Database App 420 may also be located on Display Computer 400. This app may store information from one or more RF units, and the stored information may be retrieved and filtered before sending them to Display App 410. With proper filtering in Database App 420, short duration targets may be located, false targets and authorized emitters may not need to be displayed, and noise and displayed clutter may be removed.

In one implementation, a single system live mode may allow information from multiple RF units to be directed to Display App 410 for live viewing and to the Database App 420 for storage and later query or display with a combination of fixed and mobile RF units. The accuracy of active hunting or moving targets may be dramatically increased. In another implementation, a single system history mode may allow past messages to be retrieved and filtered from Database App 420 to display past events. In yet another implementation, a multiple system mode may comprise multiple systems connected for increased coverage and accuracy.

The Wide Area Direction Finding system may be designed to be modular to allow the user to customize their system to their needs. The system may be designed to accommodate different frequencies, system expansions, and changing configurations of RF units, among other things. An RF mask in Display Computer 400 may be used to decrease potential interference from channels surrounding the target frequency. The RF mask may be user customizable to allow the system to accurately operate at multiple frequencies, while still removing noise from the signal.

The system may be designed to work for short duration targets, among other things. These short duration targets may be saved in the display computer's history and may be recalled after the transmission is completed. This feature of the system may be used to locate a missing plane after the black box stops transmitting, among other things.

In addition, this system may be designed to locate both stationary and moving targets. The ability to track moving targets may be used to locate radio-tagged wildlife, among other things. The option to use multiple RF units may allow for increased area coverage and accuracy when tracking moving targets. The customization of this system may allow it to be amended and used in numerous applications, such as avalanche rescue and reconnaissance, among other things.

Figure 5:
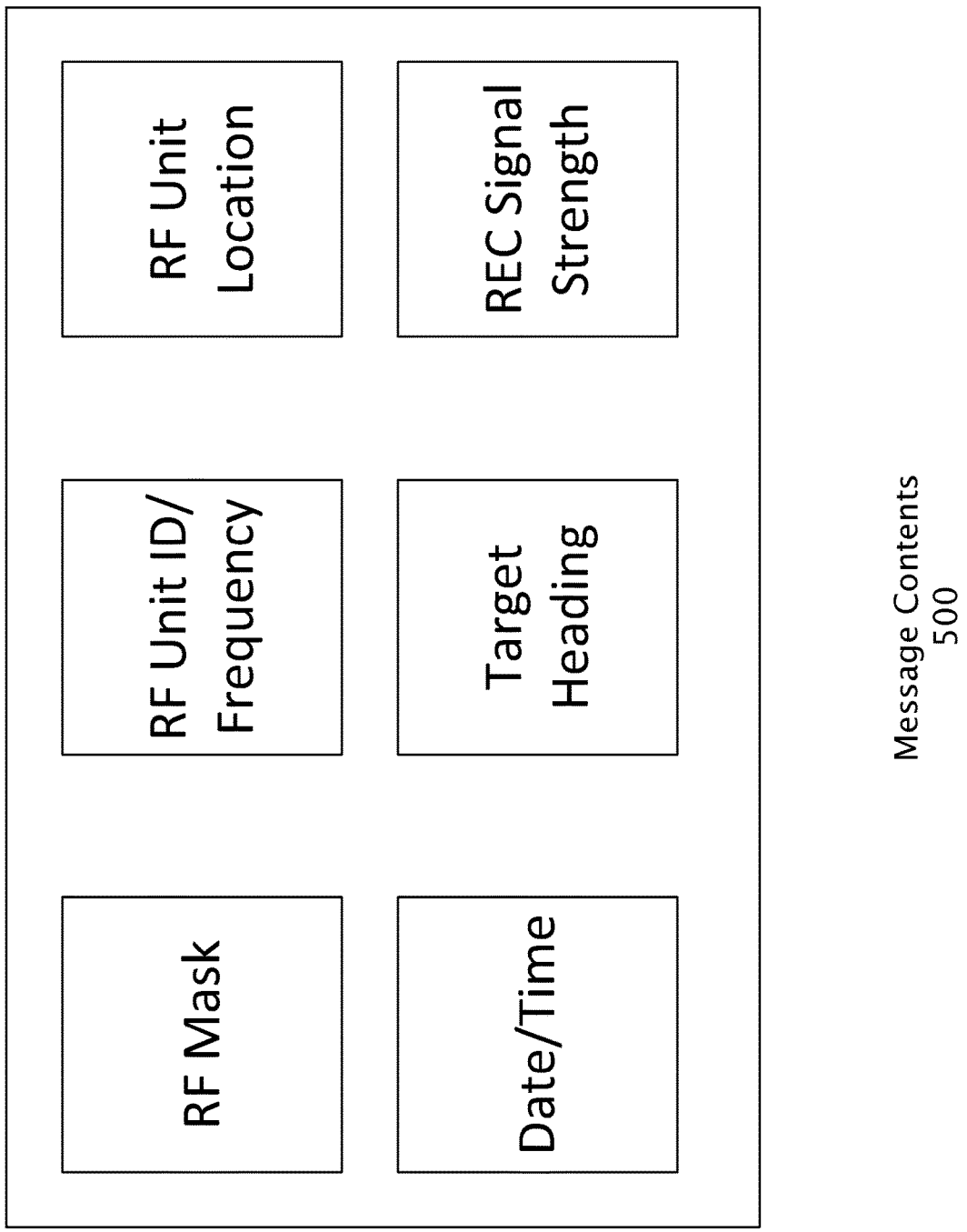
FIG. 5 is a block diagram illustrating message contents for a Wide Area Direction Finding system, according to one implementation.

FIG. 5 is a block diagram illustrating message contents for a Wide Area Direction Finding system. In one implementation, Message Contents 500 may comprise data packets sent between RF units and the display computer, which may include an RF Mask, RF Unit ID/Frequency, RF Unit Location, Data/Time, Target Heading, and Recording Signal Strength, for example. The RF Mask may be designed to remove noise from the signal through frequency attenuation, frequency-hopping spread spectrum (FHSS), or code division multiple access (CDMA), among other methods.

Figure 6:
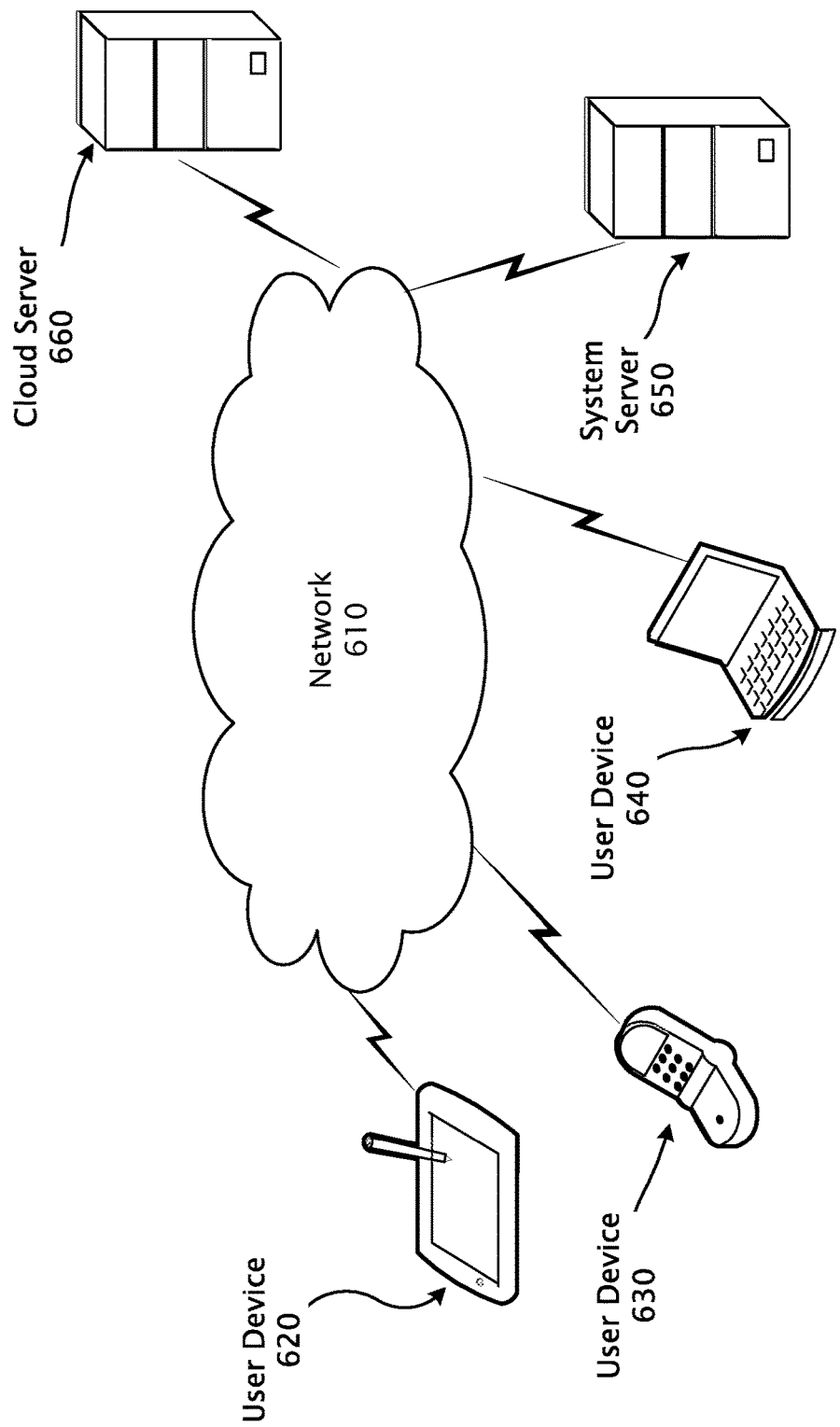
FIG. 6 is a block diagram illustrating an example of a system capable of supporting a Wide Area Direction Finding process.

FIG. 6 is a block diagram illustrating an example of a system capable of supporting a Wide Area Direction Finding process. Network 610 may include WI-FI wireless networking, cellular data access methods, such as 3G or 4GLTE, BLUETOOTH low-power wireless connectivity technology, Near Field Communications (NFC), Ethernet connectivity, fiber optic connections, the internet, local area networks, wide area networks, or any combination of these or other means of providing data transfer capabilities.

User Device 620, 630, or 640 may have network capabilities to communicate with System Server 650 or Cloud Server 660. System Server 650 or Cloud Server 660 may each include one or more computers, and may serve a number of roles. System Server 650 or Cloud Server 660 may be conventionally constructed, or may be of a special purpose design for processing data obtained from Wide Area Direction Finding. One skilled in the art will recognize that System Server 650 or Cloud Server 660 may be of many different designs and may have different capabilities.

One having skill in the art will recognize that various configurations for User Device 620, 630, or 640 and System Server 650 or Cloud Server 660 may be used to implement Wide Area Direction Finding.

Figure 7:
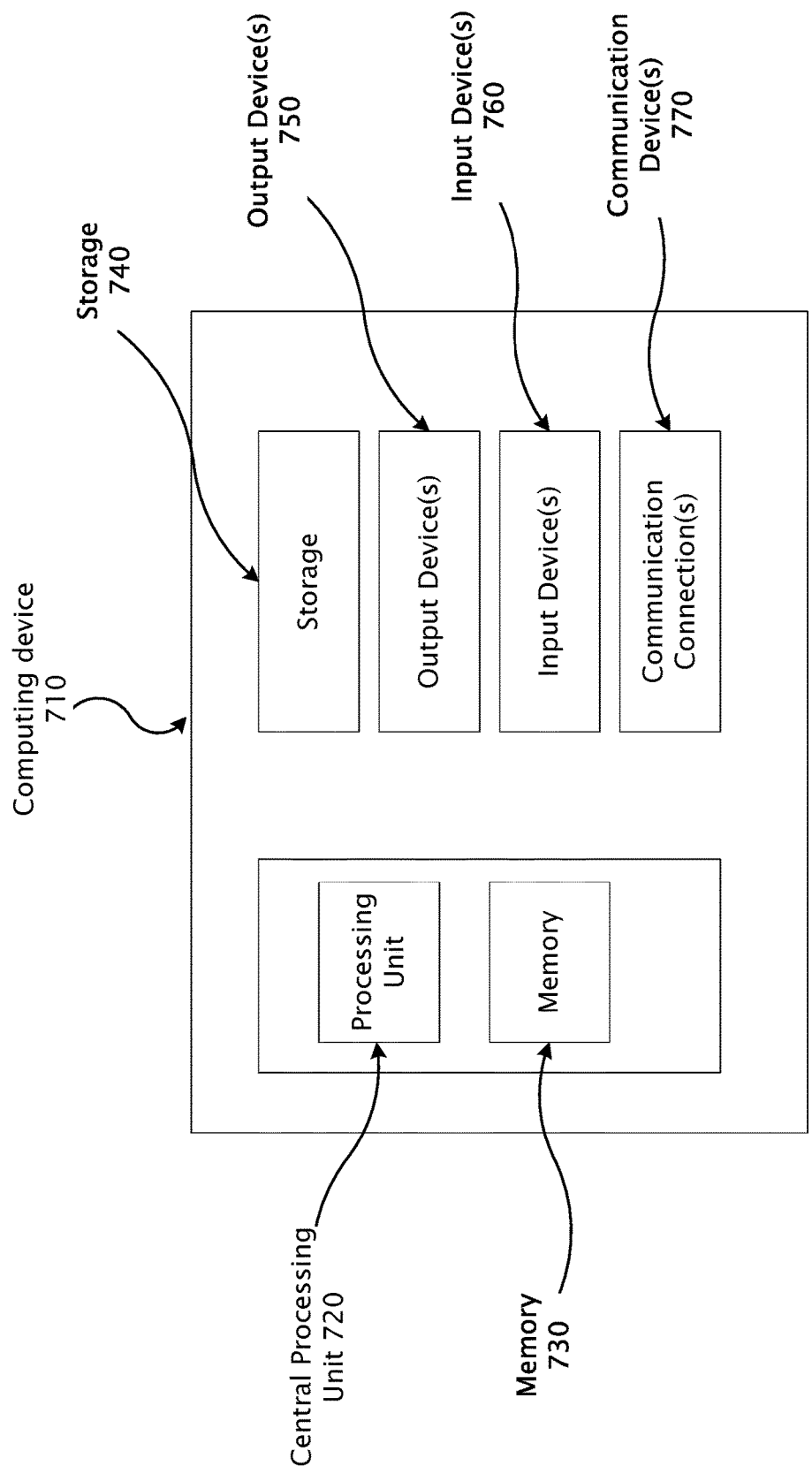
FIG. 7 is a component diagram of a computing device which may support a Wide Area Direction Finding process.

FIG. 7 is a component diagram of a computing device which may support a Wide Area Direction Finding process.

Computing Device 710 can be utilized to implement one or more computing devices, computer processes, or software modules described herein, including, for example, but not limited to a mobile device. In one example, Computing Device 710 can be used to process calculations, execute instructions, and receive and transmit digital signals. In another example, Computing Device 710 can be utilized to process calculations, execute instructions, receive and transmit digital signals, receive and transmit search queries and hypertext, and compile computer code suitable for a mobile device. Computing Device 710 can be any general or special purpose computer now known or to become known capable of performing the steps or performing the functions described herein, either in software, hardware, firmware, or a combination thereof.

In its most basic configuration, Computing Device 710 typically includes at least one Central Processing Unit (CPU) 720 and Memory 730. Depending on the exact configuration and type of Computing Device 710, Memory 730 may be volatile (such as RAM), non-volatile (such as ROM, flash memory, etc.) or some combination of the two. Additionally, Computing Device 710 may also have additional features/functionality. For example, Computing Device 710 may include multiple CPUs. The described methods may be executed in any manner by any processing unit in Computing Device 710. For example, the described process may be executed by both multiple CPUs in parallel.

Computing Device 710 may also include additional storage (removable or non-removable) including, but not limited to, magnetic or optical disks or tape. Such additional storage is illustrated by Storage 740. Computer-readable storage media includes volatile and nonvolatile, removable and non-removable media implemented in any method or technology for storage of information such as computer-readable instructions, data structures, program modules or other data. Memory 730 and Storage 740 are all examples of computer-readable storage media. Computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by Computing Device 710. Any such computer-readable storage media may be part of Computing Device 710. But computer-readable storage media does not include transient signals.

Computing Device 710 may also contain Communications Device(s) 770 that allow the device to communicate with other devices. Communications Device(s) 770 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer-readable media as used herein includes both computer-readable storage media and communication media. The described methods may be encoded in any computer-readable media in any form, such as data, computer-executable instructions, and the like.

Computing Device 710 may also have Input Device(s) 760 such as a keyboard, mouse, pen, voice input device, touch input device, etc. Output Device(s) 750 such as a display, speakers, printer, etc. may also be included. All these devices are well-known in the art and need not be discussed at length.

Those skilled in the art will realize that storage devices utilized to store program instructions may be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

While the detailed description above has been expressed in terms of specific examples, those skilled in the art will appreciate that many other configurations could be used. Accordingly, it will be appreciated that various equivalent modifications of the above-described implementations may be made without departing from the spirit and scope of the invention.

Additionally, the illustrated operations in the description show certain events occurring in a certain order. In alternative implementations, certain operations may be performed in a different order, modified or removed. Moreover, steps may be added to the above-described logic and still conform to the described implementations. Further, operations described herein may occur sequentially, or certain operations may be processed in parallel. Yet further operations may be performed by a single processing unit or by distributed processing units.

The invention claimed is:

1. A wide area direction finding system, comprising:
a plurality of radio frequency (RF) receiving units, wherein the RF receiving units are phase correlated; and
a display computer,
wherein, the system is designed to locate signals designed to emit for a given duration, and wherein the given duration signals are saved in the display computer history and are accessible after the transmission of the short duration signal has stopped transmitting
and wherein the wide area direction finding system is further configured to operate with minimal bandwidth connectivity between the RF units and the display computer enabling use of the system with a plurality of network conditions and to further enable more than one physical locations of a user, wherein connectivity comprises at least one a physical wires, ethernet, cables, cellular services, cloud services, two-way radio, or satellites.

2. The wide area direction finding system of claim 1, wherein the RF receiving units are configured to be in different geographic areas to make use of triangulation.

3. The wide are direction finding system of claim 1, further configured to measure a phase or frequency of a received signal using methods from a list containing pseudo Doppler or phase correlation.

4. The wide area direction finding system of claim 1, wherein phase information from each of the RF units is processed in the display computer to determine a direction from which the signal is emanating.

5. The wide area direction finding system of claim 1, wherein each RF unit's distance from the received signal may be computed using a time distance of arrival.

6. The wide area direction finding system of claim 1, wherein at least one RF receiving unit has GPS technology operable to facilitate time-syncing the RF units and received signals.

7. The wide area direction finding system of claim 1, wherein the system is modular.

8. The wide area direction finding system of claim 1, wherein the display computer uses an RF mask to decrease potential interference from channels surrounding a target frequency.

9. The wide area direction finding system of claim 8, wherein the RF mask is user-customizable to allow the system to accurately operate at multiple frequencies, while still removing noise from a signal.

10. The wide area direction finding system of claim 8, wherein the RF mask is designed to remove noise from the signal through methods from a list including frequency attenuation, frequency-hopping spread spectrum (FHSS), and code division multiple access (CDMA).

11. The wide area direction finding system of claim 1, wherein the system is configured to locate both stationary and moving targets.

12. The wide are direction finding system of claim 1, wherein targets may be saved in a history on the display computer and recalled after a transmission is completed.

* * * * *